(12) United States Patent
Lee et al.

(10) Patent No.: US 11,074,754 B2
(45) Date of Patent: Jul. 27, 2021

(54) ELECTRONIC DEVICE

(71) Applicant: LG ELECTRONICS INC., Seoul (KR)

(72) Inventors: Hak Lim Lee, Seoul (KR); Sam Youp Kim, Bucheon-si (KR); Ji Yong Shin, Seoul (KR); Jong Beom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 16/577,924

(22) Filed: Sep. 20, 2019

(65) Prior Publication Data

US 2020/0013228 A1    Jan. 9, 2020

(30) Foreign Application Priority Data

Aug. 28, 2019    (KR) .................. 10-2019-0105854

(51) Int. Cl.
| | | |
|---|---|---|
| *G06T 19/00* | (2011.01) | |
| *G06F 3/01* | (2006.01) | |
| *H04N 13/122* | (2018.01) | |
| *G06F 1/16* | (2006.01) | |
| *G02B 27/01* | (2006.01) | |

(52) U.S. Cl.
CPC .......... *G06T 19/006* (2013.01); *G02B 27/017* (2013.01); *G06F 1/1675* (2013.01); *G06F 3/011* (2013.01); *H04N 13/122* (2018.05)

(58) Field of Classification Search
CPC ..... G06T 19/006; G06T 1/1675; G06T 19/00; G06F 3/011; G06F 3/012; G06F 1/1686; G06F 3/0346; G06F 3/0325; G06F 3/0304; G06F 1/163; G06F 3/01; G06F 1/16; G06F 1/1601; G06F 1/1616; G06F 1/1637; G06F 1/1654; G06F 1/1677; H04N 13/122; G02B 27/017; G02B 27/0172; G02B 27/0176; G02B 2027/013; G02B 2027/0114; G02B 2027/014; G02B 27/01; A42B 3/042
See application file for complete search history.

(56) References Cited

U.S. PATENT DOCUMENTS

2007/0279318 A1*  12/2007  Yamamoto ......... G02B 27/0172
                                                                    345/8
2014/0085190 A1*  3/2014  Erinjippurath ..... G02B 27/0172
                                                                    345/156

(Continued)

FOREIGN PATENT DOCUMENTS

| KR | 1020190041048 | 4/2019 |
| KR | 1020190067523 | 6/2019 |

*Primary Examiner* — Xilin Guo
(74) *Attorney, Agent, or Firm* — Lee, Hong, Degerman, Kang & Waimey PC

(57) ABSTRACT

An electronic device is disclosed. The electronic device of the present disclosure includes a main body wearable on the head of a user, a display coupled to the main body to be detachable to the main body, and a controller configured to generate images to implement the images on the display while the display is mounted on the main body. An electronic device according to the present invention may be associated with an artificial intelligence module, robot, augmented reality (AR) device, virtual reality (VR) device, and device related to 5G services.

15 Claims, 21 Drawing Sheets

(56) References Cited

U.S. PATENT DOCUMENTS

2016/0253006 A1\* 9/2016 Lyons .................... G02B 7/023
 345/174
2019/0086669 A1\* 3/2019 Percival ............. G02B 27/0172
2019/0155337 A1\* 5/2019 Ohkawa ................. G06F 1/163

\* cited by examiner (a)  (b)

(a)

(b)

(c)

(d)

(e)

(f)

(a)

(b)

(c)

(d)

(a)

(b)

(c)

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0105854, filed on Aug. 28, 2019, the contents of which are hereby incorporated by reference herein in its entirety.

BACKGROUND

1. Technical Field

The present disclosure relates to an electronic device and, more particularly, to an electronic device used for Virtual Reality (VR), Augmented Reality (AR), and Mixed Reality (MR).

2. Description of Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted. In particular, research is being actively conducted on equipment for allowing a user to wear the electronic device manufactured for a predetermined purpose to experience the above technology.

However, in the case of the electronic device as described above, the size and shape of the electronic device are different depending on the usage, so that it is necessary to have different electronic devices in order to use them in various applications.

In particular, depending on the environment in which the user uses the electronic device as described above, a case in which a display having a special size and shape may be required regardless of other configurations may occur.

In such a case, it may be more preferable to use only the display in a replacement type in the electronic device than to having respective electronic devices corresponding to every use environment in terms of convenience of use as well as cost of the user.

In relation to such an electronic device, Korean Patent Publication No. 10-2019-0041048 (hereinafter referred to as "Prior Document 1") discloses a motion sensing augmented reality glass.

Specifically, a configuration of the augmented reality glass including a display disposed in front of the user's eyes to display a virtual image and a pair of glass temples to be attached to the user's face is disclosed in Prior Document 1.

However, since the augmented reality glass of Prior Document 1 does not have any consideration for the configuration to be able to replace a specific element, so that the augmented reality glass is limited to the configuration for a specific use and thus the availability thereof is limited.

In addition, Korean Patent Publication No. 10-2019-0067523 (hereinafter referred to as "Prior Document 2") discloses a glass type terminal and a method of operating the same.

Specifically, Prior Document 2 discloses a main body, a frame coupled to the main body, a configuration for adjusting a separation distance between the frames, a configuration for changing the resolution according to adjustment of the separation distance, and the like.

However, the glass type terminal of Prior Document 2 is only a configuration for adjusting the frame according to the physical characteristics of each user and does not consider any configuration that may replace a specific element according to the usage.

As described above, the electronic device used in the technical field has a problem to improve the usability and economy of the user by replacing and using a specific configuration to correspond to various uses, but the conventional electronic device fails to properly solve the problem.

SUMMARY OF THE INVENTION

An aspect of the present disclosure is to provide an electronic device of which a specific configuration is interchangeably manufactured to be changed and used variously according to a usage in using the electronic device used in Virtual Reality (VR), Augmented Reality (AR), Mixed Reality (MR), etc.

Another aspect of the present disclosure is to provide an electronic device in which a specific configuration is easily replaced according to a use purpose in terms of a user.

Yet another aspect of the present disclosure is to provide an electronic device in which a specific configuration may be replaced even if a user does not directly apply an external force for replacement.

An electronic device according to an embodiment of the present disclosure is configured to replace and use a display according to a usage. Specifically, the display is detachably coupled to the main body worn on the head of the user.

In addition, the electronic device according to an embodiment of the present disclosure is configured to facilitate mounting and detachment of the display to the main body in terms of a user. Specifically, a first coupler formed in the main body and a second coupler formed in the display are attachable to each other by a magnetic force.

In this case, a bracket exerting different magnetic forces from the first coupler and the second coupler may be disposed, and the bracket may move due to a difference in magnetic force when the first coupler and the second coupler are coupled to each other.

Further, in the electronic device according to an embodiment of the present disclosure, even if the user does not directly remove the display from the main body, the display may be automatically removed as necessary. Specifically, the coupling of the first coupler and the second coupler may be adjusted by an electromagnetic force.

Also, the electronic device according to an embodiment of the present disclosure may detect the state of the main body to control the electromagnetic force accordingly.

In this case, the first coupler and the second coupler may be controlled to apply an electromagnetic force to push each other.

Also, the electronic device according to an embodiment of the present disclosure may detect a movement state of the main body to control the electromagnetic force accordingly.

Also, the electronic device according to an embodiment of the present disclosure may detect a deformation state of the main body to control the electromagnetic force accordingly.

Further, in the electronic device according to an embodiment of the present disclosure, the main body may include a frame and the first coupler may be detachably coupled to the frame.

In this case, the first coupler and the frame may be limited from being detached from each other through the protrusions and the latches, respectively.

Further, in the electronic device according to an embodiment of the present disclosure, the first coupler may be pressed in a separating direction by a second elastic body installed in the frame.

Further, in the electronic device according to an embodiment of the present disclosure, a plurality of frames may be installed, and the first coupler may be selectively fastened to any one of the plurality of frames.

Further, in the electronic device according to an embodiment of the present disclosure, the display may be formed in a structure of a plurality of layers.

Further, the electronic device according to an embodiment of the present disclosure may further include an image capture means and a power supplier, which may be installed on the main body.

Further, the electronic device according to an embodiment of the present disclosure may adjust an angle of the display to the eyes of the user.

An electronic device according to an embodiment of the present disclosure is configured to replace and use a controller according to a usage. Specifically, the controller is detachably coupled to the main body worn on the head of the user.

In this case, the main body and the controller may be attached to each other by a magnetic force.

Since the display is detachably coupled to the main body worn on the head of the user, the electronic device according to an embodiment of the present disclosure may replace and use the display variously according to a usage.

According to at least one of the embodiments of the present disclosure, since the first coupler formed in the main body and the second coupler formed in the display are attachable to each other, the display may be more easily replaced.

According to at least one of the embodiments of the present disclosure, since a bracket exerting different magnetic forces from the first coupler and the second coupler may be disposed, and the bracket may move due to a difference in magnetic force when the first coupler and the second coupler are coupled to each other, the coupling of the first coupler and the second coupler may be more stably performed.

According to at least one of the embodiments of the present disclosure, since the coupling of the first coupler and the second coupler is adjusted by an electromagnetic force, the display may be replaced even if the user directly applies an external force for replacement.

According to at least one of the embodiments of the present disclosure, since the state of the main body is detected to control an electromagnetic force accordingly, the detachment of the display may be appropriately adjusted according to a state of the main body.

According to at least one of the embodiments of the present disclosure, since the first coupler and the second coupler are controlled to apply an electromagnetic force to push each other, the display may be separated by only an electromagnetic force when the removal of the display is required.

According to at least one of the embodiments of the present disclosure, since the movement state of the main body is detected to control the electromagnetic force accordingly, the display may be automatically detached when the movement state of the main body is not appropriate.

According to at least one of the embodiments of the present disclosure, since the deformation state of the main body is detected to control the electromagnetic force accordingly, the display may be automatically detached when the deformation state of the main body is not appropriate.

According to at least one of the embodiments of the present disclosure, since the main body includes a frame and the first coupler is detachably coupled to the frame, it is possible to minimize a configuration of the main body when the display is not used.

According to at least one of the embodiments of the present disclosure, since the first coupler and the frame may be limited from being detached from each other through the protrusions and the latches, respectively, the coupling of the first coupler and the frame may be more stably performed.

According to at least one of the embodiments of the present disclosure, since the first coupler is pressed in a separated direction by a second elastic body installed in the frame, when it is necessary to separate the first coupler from the frame, the separation may be easily performed using an elastic force.

According to at least one of the embodiments of the present disclosure, since a plurality of frames is installed and the first coupler is selectively fastened to any one of the plurality of frames, the display may be installed at an optimal focal distance according to a situation.

According to at least one of the embodiments of the present disclosure, since the display is formed in a structure of a plurality of layers, a more 3D visual image may be provided to the user.

According to at least one of the embodiments of the present disclosure, since the electronic device further includes an image capture means and a power supplier, which are installed on the main body, it is possible to more simplify a structure for the configurations other than the main body.

According to at least one of the embodiments of the present disclosure, since the electronic device may adjust an angle of the display to the eyes of the user, it is possible to adjust the display to have an optimal viewing angle according to a body characteristic of the user.

According to at least one of the embodiments of the present disclosure, since the controller is detachably coupled to the main body worn on the head of the user, it is possible to replace and use the controller variously according to a usage.

According to at least one of the embodiments of the present disclosure, since the main body and the controller are attached to each other by a magnetic force, the controller may be more easily replaced.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
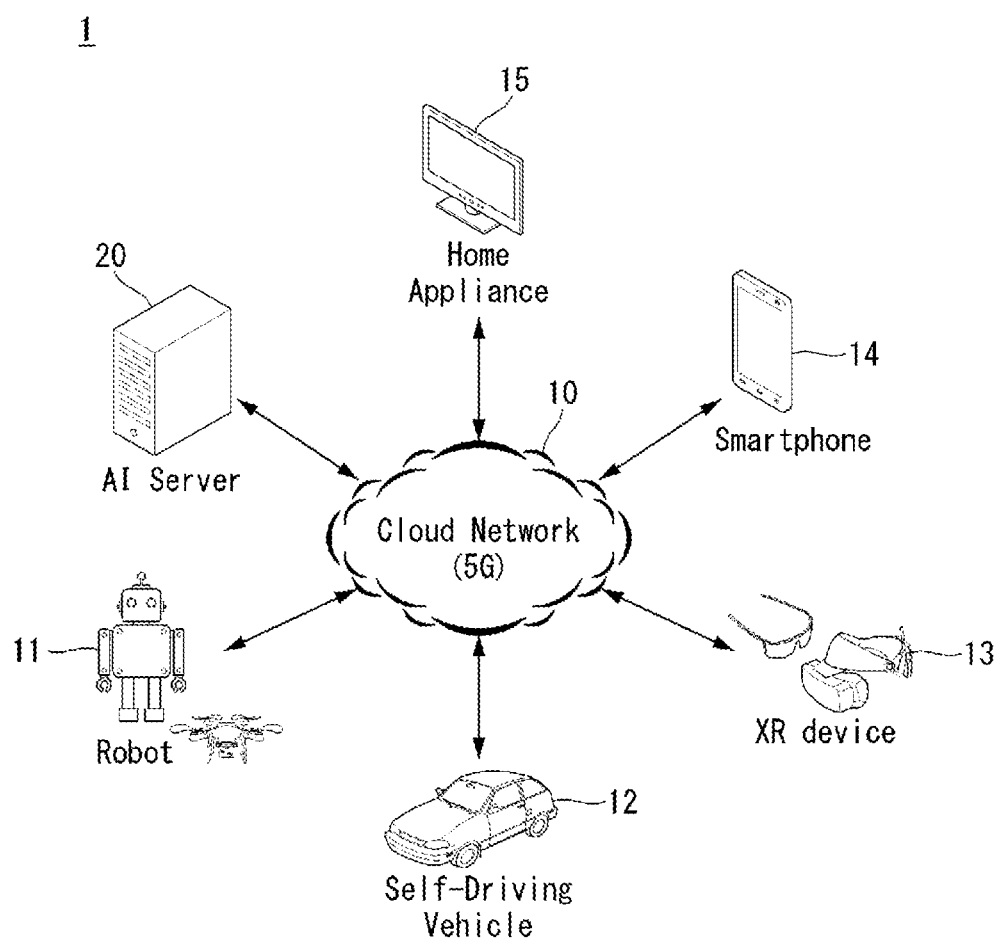
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the present embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use cases may require a plurality of areas for optimization, but other use case may focus only one Key Performance Indicator (KPI). The 5G system supports various use cases in a flexible and reliable manner. The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. In addition, the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. The entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks including intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communications are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 is schematic diagram illustrating one embodiment of an AI device.

Referring to FIG. 1, in the AI system, at least one or more of an AI server 16, robot 11, a self-driving vehicle 12, an XR device 13, a smartphone 14, or a home appliance 15 are connected to a cloud network 10. Here, the robot 11, the self-driving vehicle 12, the XR device 13, the smartphone 14, or the home appliance 15 to which the AI technology has been applied may be referred to as AI devices 11 to 15.

The cloud network 10 may include part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices 11 to 15 constituting the AI system may be connected to each other through the cloud network 10. In particular, each of the individual devices 11 to 15 may communicate with each other through the base station but may communicate directly to each other without relying on the base station.

The AI server 16 may include a server performing AI processing and a server performing computations on big data.

The AI server 16 may be connected to at least one or more of the robot 11, the self-driving vehicle 12, the XR device 13, the smartphone 14, or the home appliance 15, which are AI devices constituting the AI system, through the cloud network 10 and may help at least part of AI processing conducted in the connected AI devices 11 to 15.

At this time, the AI server 16 may teach the artificial neural network according to a machine learning algorithm on behalf of the AI devices 11 to 15, directly store the learning model, or transmit the learning model to the AI devices 11 to 15.

At this time, the AI server 16 may receive input data from the AI devices 11 to 15, infer a result value from the received input data by using the learning model, generate a response or control command based on the inferred result value, and transmit the generated response or control command to the AI devices 11 to 15.

Similarly, the AI devices 11 to 15 may infer a result value from the input data by employing the learning model directly and generate a response or control command based on the inferred result value.

<AI+Robot>

By employing the AI technology, the robot 11 may be implemented as a guide robot, a transport robot, a cleaning robot, a wearable robot, an entertainment robot, a pet robot, or an unmanned flying robot.

The robot 11 may include a robot control module for controlling its motion, where the robot control module may correspond to a software module or a chip which implements the software module in hardware.

The robot 11 may obtain status information of the robot 11, detect (recognize) the surroundings and objects, generate map data, determine a travel path and a navigation plan, determine a response to user interaction, or determine motion by using sensor information obtained from various types of sensors.

Here, the robot 11 may use sensor information obtained from at least one or more sensors among a lidar, a radar, and a camera to determine the travel path and the navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. In addition, the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Here, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. In addition, the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), a Head-Up Display (HUD) installed at the vehicle, a TV, a mobile phone, a smartphone, a computer, a wearable device, a home appliance, a digital signage, a vehicle, a robot with a fixed platform, or a mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display. For example, the XR device 13 may output XR objects including additional information on recognized objects in correspondence with the recognized objects.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, a transport robot, a cleaning robot, a wearable robot, an entertainment robot, a pet robot, or an unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI and XR technologies, the robot 11 may be implemented as a guide robot, a transport robot, a cleaning robot, a wearable robot, an entertainment robot, a pet robot, an unmanned flying robot, a drone, or the like.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. In addition, the robot 11 may operate based on the control signal received through the XR device 13 or based on the interaction with the user.

For example, the user may check the XR image corresponding to the viewpoint of the robot 11 associated remotely through an external device such as the XR device 13, modify the autonomous navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, an unmanned ground vehicle, or an unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR objects corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. In addition, the self-driving vehicle 12 may operate based on the control signal received through an external device such as the XR device 13 or based on the interaction with the user.

[Extended Reality Technology]

EXtended Reality (XR) refers to all of Virtual Reality (VR), Augmented Reality (AR), and Mixed Reality (MR).

VR technology provides real world objects or backgrounds only in CG images, AR technology provides virtual CG images on real objects images, and MR technology mixes and combines virtual objects in the real world.

MR technology is similar to AR technology in that it shows both real and virtual objects. However, while virtual objects supplement physical objects in AR, virtual and physical objects co-exist as equivalents in MR.

XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

Hereinafter, an electronic device providing XR according to an embodiment of the present disclosure will be described.

Figure 2:
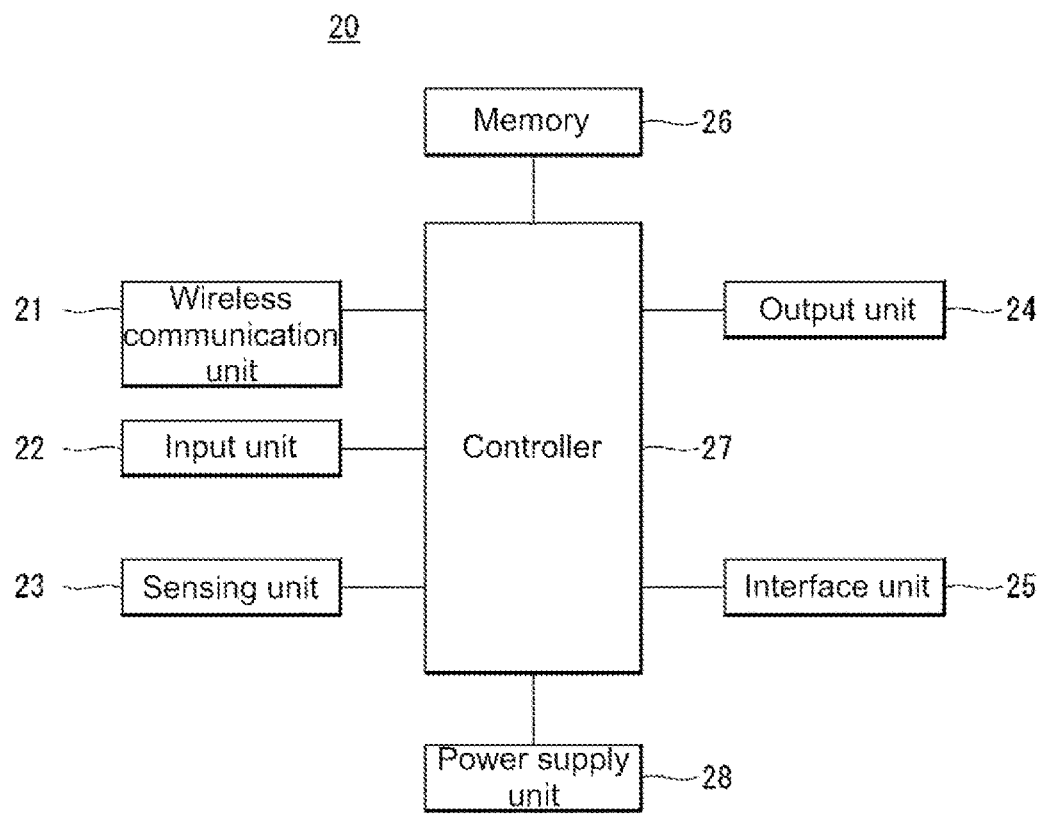
FIG. 2 is a block diagram illustrating the structure of an eXtended Reality (XR) electronic device according to one embodiment of the present disclosure.

FIG. 2 is a block diagram illustrating the structure of an XR electronic device 20 according to an embodiment of the present disclosure.

Referring to FIG. 2, the XR electronic device 20 may include a wireless communicator 21, an inputter 22, a sensor 23, an outputter 24, an interface 25, a memory 26, a controller 27, and a power supplier 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communicator 21 may include one or more modules which enable wireless communication between the electronic device 20 and a wireless communication system, between the electronic device 20 and other electronic devices, or between the electronic device 20 and an external server. Also, the wireless communicator 21 may include one or more modules that connect the electronic device 20 to one or more networks.

The wireless communicator 21 may include at least one of a broadcast receiving module, mobile communication module, wireless Internet module, short-range communication module, and location information module.

The inputter 22 may include a camera or image inputter for receiving an image signal, microphone or audio inputter for receiving an audio signal, and user inputter (for example, touch key) for receiving information from the user, and push key (for example, mechanical key). Voice data or image data collected by the inputter 22 may be analyzed and processed as a control command of the user.

The sensor 23 may include one or more sensors for sensing at least one of the surroundings of the electronic device 20 and user information.

For example, the sensor 23 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, image capture means), a microphone, a battery gauge, an environment sensor (for example, barometer, hygrometer, thermometer, radiation detection sensor, heat detection sensor, and gas detection sensor), and a chemical sensor (for example, electronic nose, health-care sensor, and biometric sensor). Meanwhile, the electronic device 20 disclosed in the present specification may utilize information collected from at least two or more sensors listed above.

The outputter 24 is intended to generate an output related to a visual, aural, or tactile stimulus and may include at least one of a display, sound outputter, haptic module, and optical outputter. The display may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface 25 serves as a path to various types of external devices connected to the electronic device 20. Through the interface 25, the electronic device 20 may receive VR or AR content from an external device and perform interaction by exchanging various input signals, sensing signals, and data.

For example, the interface 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. At least some of the application programs may be downloaded via an external server through wireless communication. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensor 23. Also, the controller 27 may detect an object approaching the vicinity of the electronic device 20 or user by using a proximity sensor, illumination sensor, magnetic sensor, infrared sensor, ultrasonic sensor, or light sensor included in the sensor 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supplier 28 receives external or internal power under the control of the controller 27 and supplies the power to each and every constituting element included in the electronic device 20. The power supplier 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
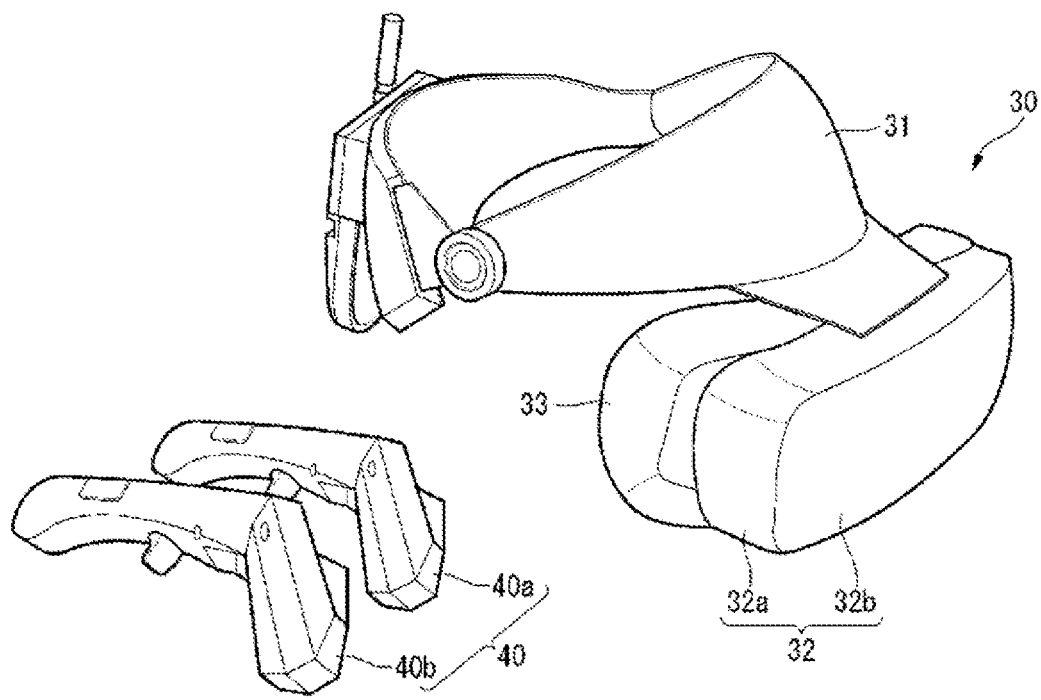
FIG. 3 is a perspective view of a VR electronic device according to one embodiment of the present disclosure.
Figure 4:
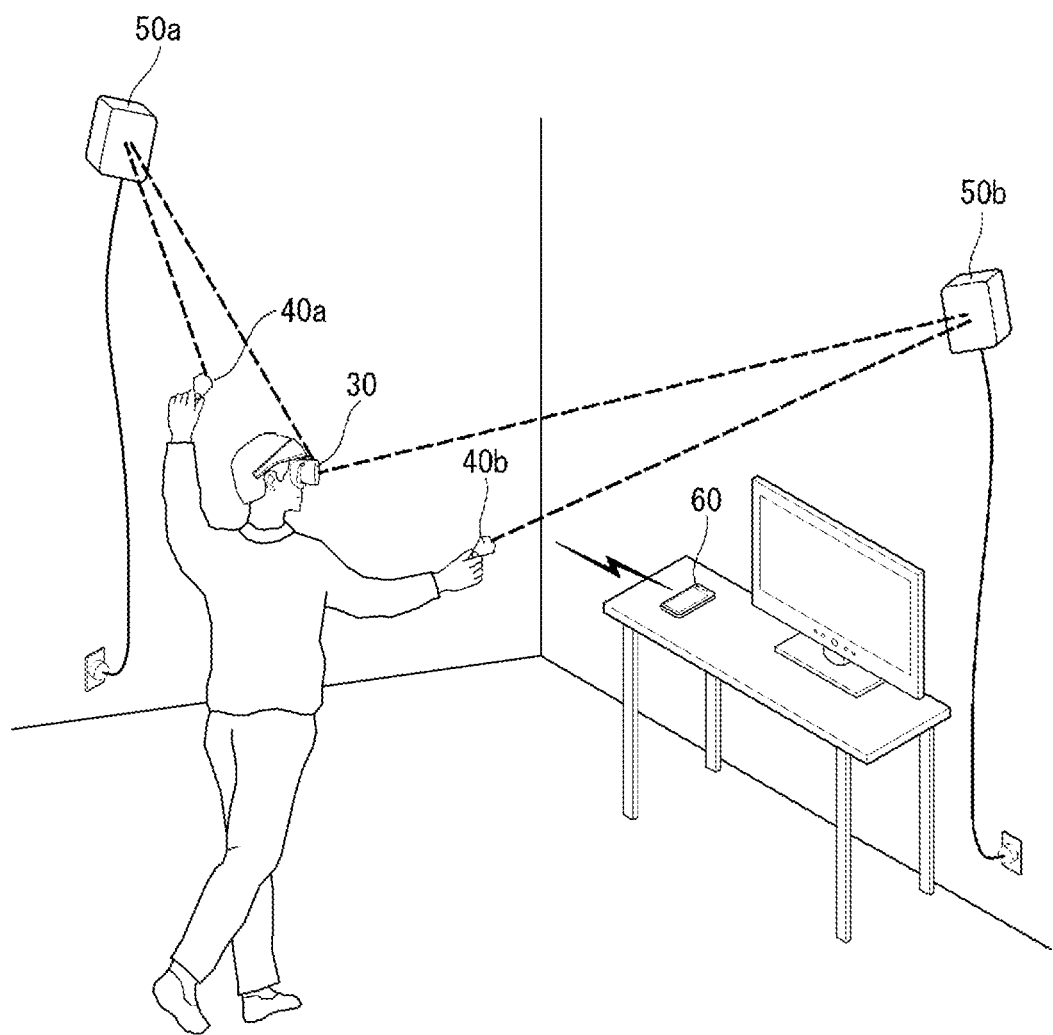
FIG. 4 illustrates a situation in which the VR electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40*a*, 40*b*) that the user may grip and manipulate.

The electronic device 30 includes a head 31 worn and supported on the head and a display 32 being combined with the head 31 and displaying a virtual image or video in front of the user's eyes. Although the figure shows that the head 31 and display 32 are made as separate units and combined together, the display 32 may also be formed being integrated into the head 31.

The head 31 may assume a structure of enclosing the head of the user so as to disperse the weight of the display 32. And to accommodate different head sizes of users, the head 31 may provide a band of variable length.

The display 32 includes a cover 32*a* combined with the head 31 and a display 32*b* containing a display panel.

The cover 32*a* is also called a goggle frame and may have the shape of a tub as a whole. The cover 32*a* has a space formed therein, and an opening is formed at the front surface of the cover unit, the position of which corresponds to the eyeballs of the user.

The display 32*b* is installed on the front surface frame of the cover 32*a* and disposed at the position corresponding to the eyes of the user to display screen information (image or video). The screen information output on the display 32*b* includes not only VR content but also external images collected through an image capture means such as a camera.

In addition, VR content displayed on the display 32*b* may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display 32*b*. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display 32*b*.

The display 32*b* may include a display panel installed at the front of the opening of the cover 32*a*, where the display panel may be an LCD or OLED panel. Similarly, the display 32*b* may be a display of a smartphone. In other words, the display 32*b* may have a specific structure in which a smartphone may be attached to or detached from the front of the cover 32*a*.

And an image capture means and various types of sensors may be installed at the front of the display 32.

The image capture means (for example, camera) is formed to capture (receive or input) the image of the front and may obtain a real world as seen by the user as an image. One image capture means may be installed at the center of the display 32*b*, or two or more of them may be installed at symmetric positions. When a plurality of image capture means is installed, a stereoscopic image may be obtained. An image combining an external image obtained from an image capture means with a virtual image may be displayed through the display 32*b*.

Various types of sensors may include a gyroscope sensor, motion sensor, or IR sensor. Various types of sensors will be described in more detail later.

At the rear of the display 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user inputter operated to receive a control command, sound outputter, and controller. Descriptions of the aforementioned units are the same as give previously and will be omitted.

Also, a VR electronic device may be equipped with a controller 40 (40*a*, 40*b*) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display 32*b* in conjunction with the electronic device 30. The controller 40 may include a grip part that the user grips and a head extended from the grip part and equipped with various sensors and a microprocessor. The grip part may be shaped as a long vertical bar so that the user may easily grip the grip part, and the head may be formed in a ring shape.

And the controller 40 may include an IR sensor, motion tracking sensor, microprocessor, and inputter. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip part of the controller 40 may provide a user inputter. For example, the user inputter may include keys disposed inside the grip part, touchpad (trackpad) equipped outside the grip part, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
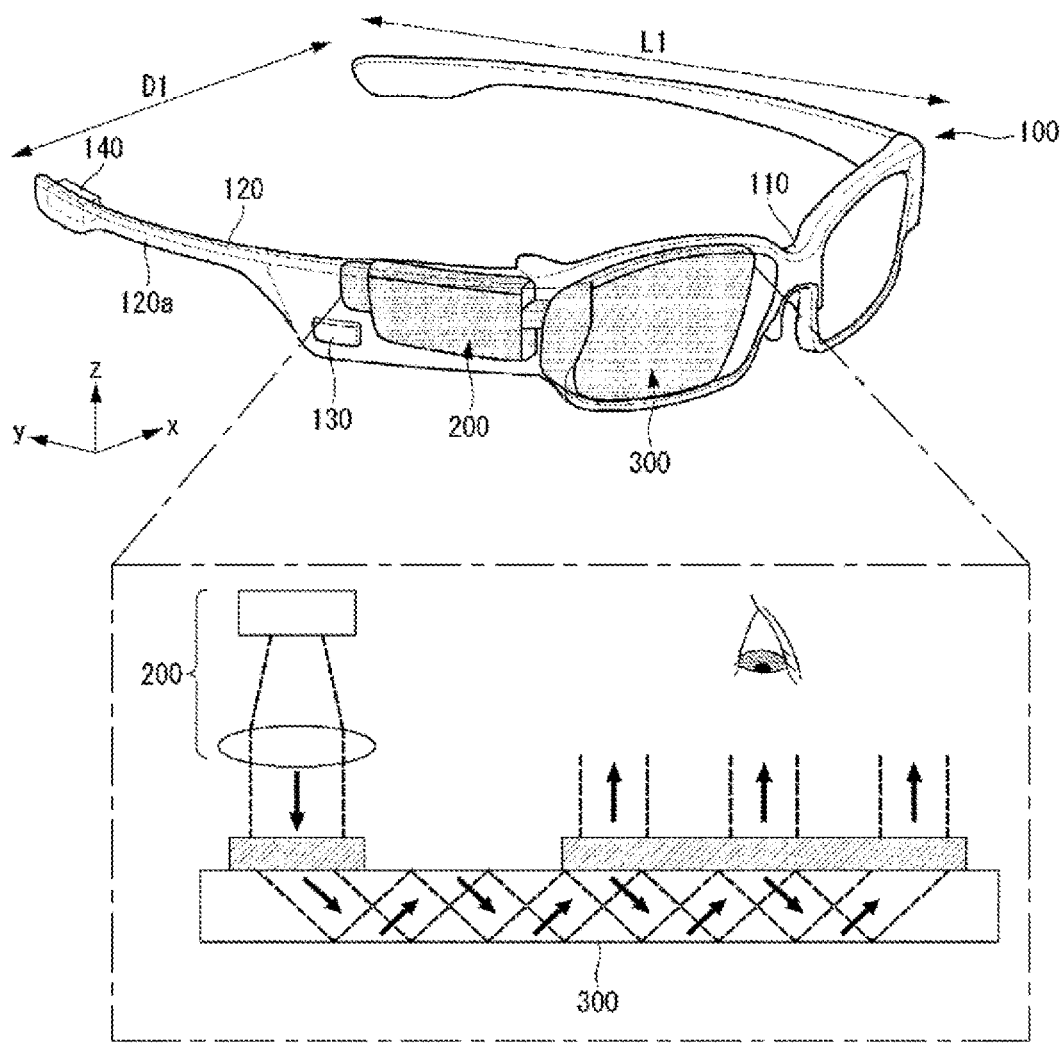
FIG. 5 is a perspective view of an AR electronic device according to one embodiment of the present disclosure.

FIG. 5 is a perspective view of an AR electronic device according to one embodiment of the present disclosure.

As shown in FIG. 5, the electronic device according to one embodiment of the present disclosure may include a frame 100, a controller 200, and a display 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user inputter 130, or sound outputter 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video including successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display 300 may be implemented in the form of a Head Mounted Display (HMD). HMD refers to a particular type of display device worn on the head and showing an image directly in front of eyes of the user. The display 300 may be disposed to correspond to at least one of left and right eyes so that images may be shown directly in front of the eye(s) of the user when the user wears the electronic device. The present figure illustrates a case where the display 300 is disposed at the position corresponding to the right eye of the user so that images may be shown before the right eye of the user.

The display 300 may be used so that an image generated by the controller 200 is shown to the user while the user visually recognizes the external environment. For example, the display 300 may project an image on the display area by using a prism.

And the display 300 may be formed to be transparent so that a projected image and a normal view (the visible part of the world as seen through the eyes of the user) in the front are shown at the same time. For example, the display 300 may be translucent and made of optical elements including glass.

And the display 300 may be fixed by being inserted into the opening included in the front frame 110 or may be fixed on the front surface 110 by being positioned on the rear surface of the opening (namely between the opening and the user's eye). Although the figure illustrates one example where the display 300 is fixed on the front surface 110 by being positioned on the rear surface of the rear surface, the display 300 may be disposed and fixed at various positions of the frame 100.

As shown in FIG. 5, the electronic device may operate so that if the controller 200 projects light about an image onto one side of the display 300, the light is emitted to the other side of the display, and the image generated by the controller 200 is shown to the user.

Accordingly, the user may see the image generated by the controller 200 while seeing the external environment simultaneously through the opening of the frame 100. In other words, the image output through the display 300 may be seen by being overlapped with a normal view. By using the display characteristic described above, the electronic device may provide an AR experience which shows a virtual image overlapped with a real image or background as a single, interwoven image.

Figure 6:
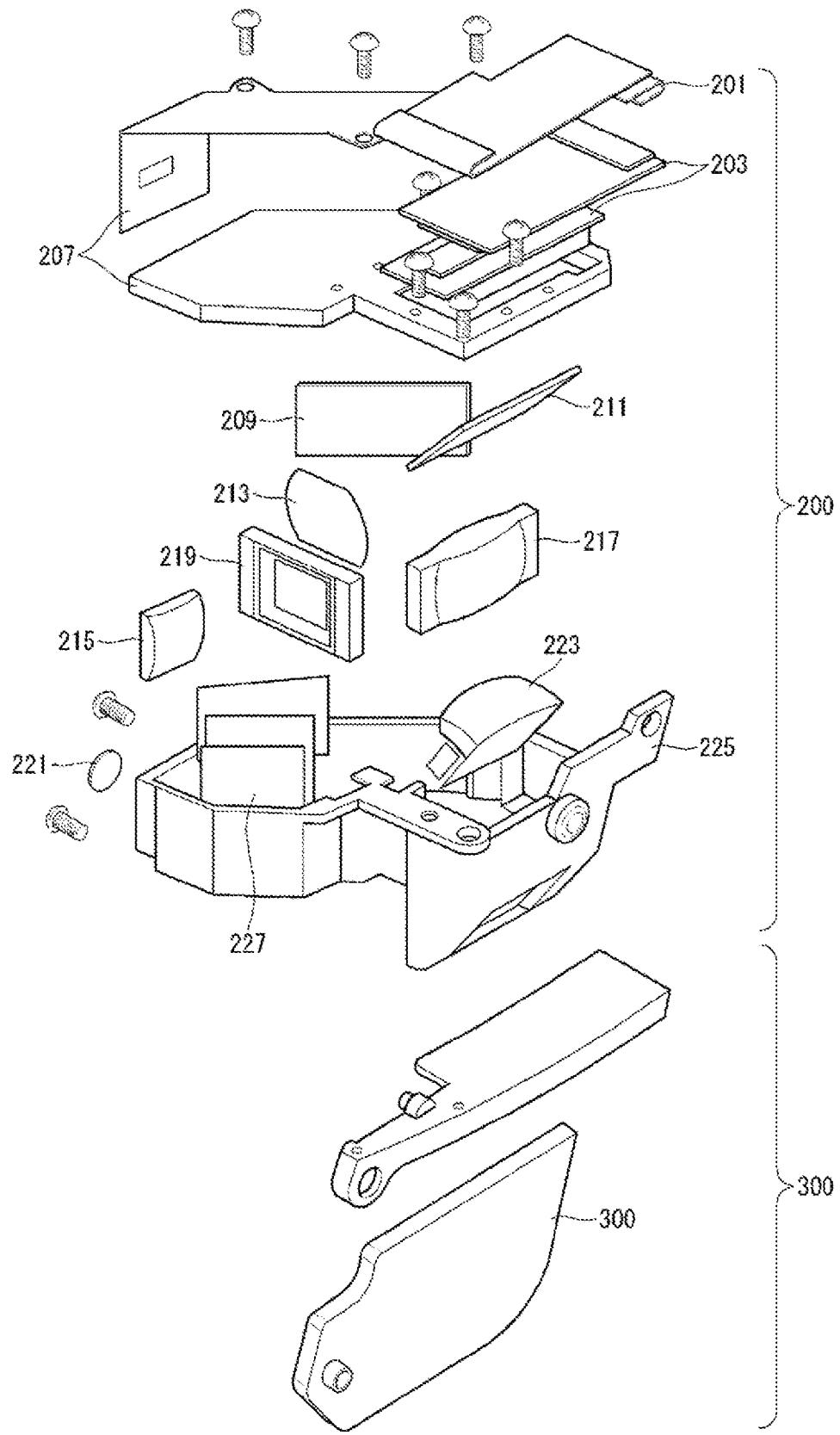
FIG. 6 is an exploded perspective view of a controller according to one embodiment of the present disclosure.

FIG. 6 is an exploded perspective view of a controller according to one embodiment of the present disclosure.

Referring to the figure, the controller 200 may include a first cover 207 and a second cover 225 for protecting internal constituting elements and forming the external appearance of the controller 200, where, inside the first 207 and the second 225 covers, included are a driver 201, an image source panel 203, a Polarization Beam Splitter Filter (PBSF) 211, a mirror 209, a plurality of lenses 213, 215, 217, 221, a Fly Eye Lens (FEL) 219, a Dichroic filter 227, and a Freeform prism Projection Lens (FPL) 223.

The first 207 and second 225 covers provide a space in which the driver 201, image source panel 203, PBSF 211, mirror 209, a plurality of lenses 213, 215, 217, 221, FEL 219, and FPL may be installed, and the internal constituting elements are packaged and fixed to either of the side frames 120.

The driver 201 may supply a driving signal that controls a video or an image displayed on the image source panel 203 and may be linked to a separate modular driving chip installed inside or outside the controller 200. The driver 201 may be installed in the form of Flexible Printed Circuits Board (FPCB), which may be equipped with heatsink that dissipates heat generated during operation to the outside.

The image source panel 203 may generate an image according to a driving signal provided by the driver 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display 300.

The display 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user inputter 130 manipulated to receive control commands. The user inputter 130 may adopt various methods including a tactile manner in which the user operates the user inputter by sensing a tactile stimulus from a touch or push motion, gesture manner in which the user inputter recognizes the hand motion of the user without a direct touch thereon, or a manner in which the user inputter recognizes a voice command. The present figure illustrates a case where the user inputter 130 is installed at the frame 100.

Also, the electronic device may be equipped with a microphone which receives a sound and converts the received sound to electrical voice data and a sound outputter 140 that outputs a sound. The sound outputter 140 may be configured to transfer a sound through an ordinary sound output scheme or bone conduction scheme. When the sound outputter 140 is configured to operate according to the bone conduction scheme, the sound outputter 140 is fit to the head when the user wears the electronic device and transmits sound by vibrating the skull.

In what follows, various forms of the display 300 and various methods for emitting incident image light rays will be described.

FIGS. 7 to 13 illustrate various types of optical elements applicable to the display 300 according to one embodiment of the present disclosure.

Figure 7:
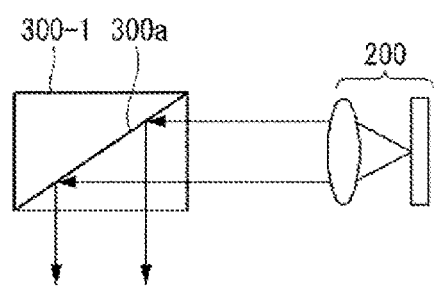
FIGS. 7 to 13 illustrate various display methods applicable to a display according to one embodiment of the present disclosure.
Figure 7:
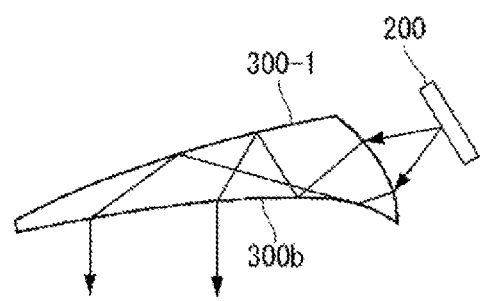
Figure 8:
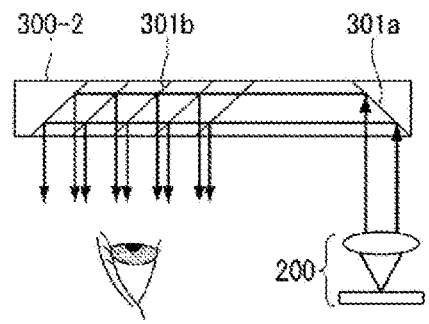
Figure 8:
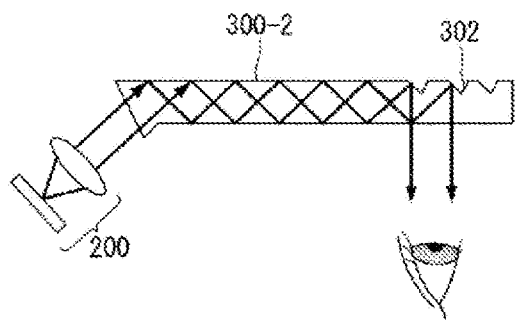
Figure 8:
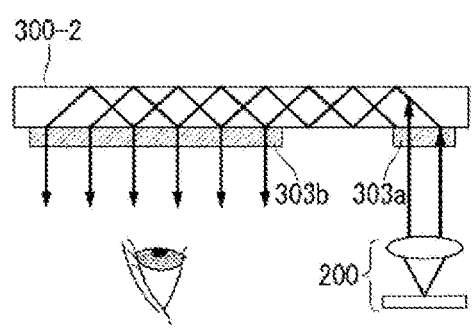
Figure 8:
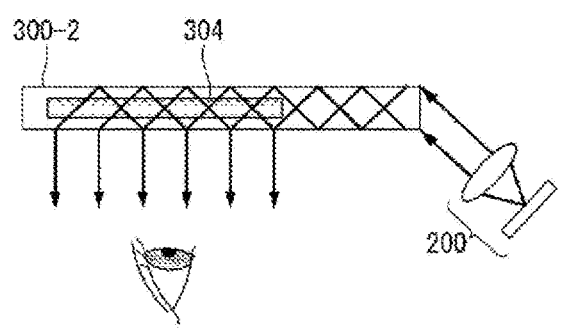
Figure 8:
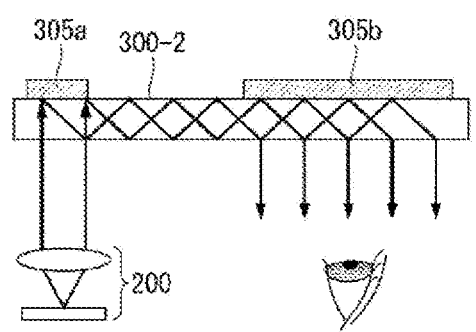
Figure 8:
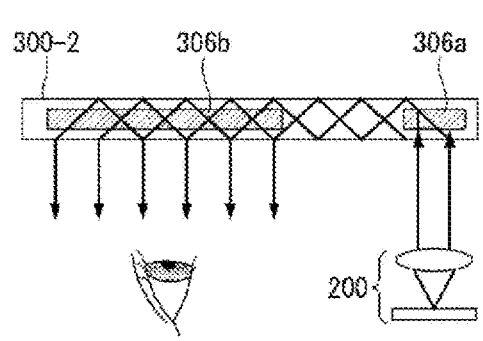
Figure 9:
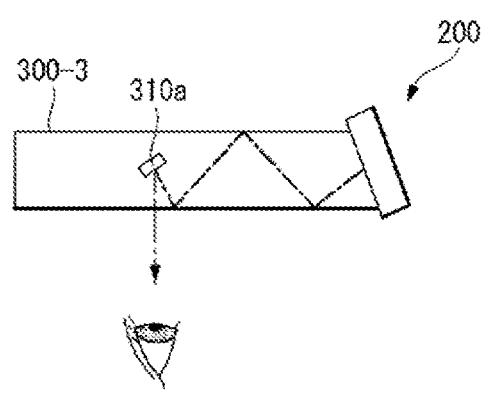
Figure 9:
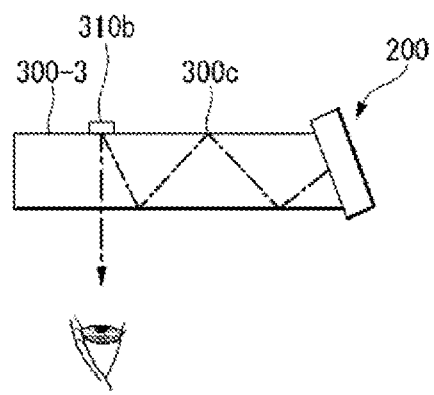
Figure 9:
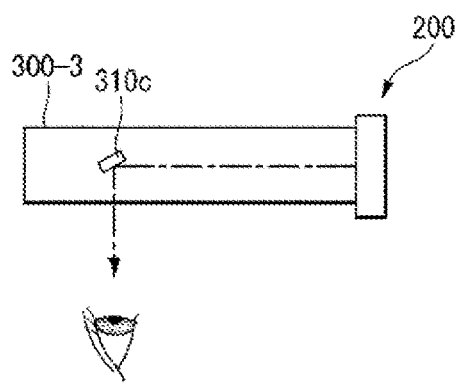
Figure 9:
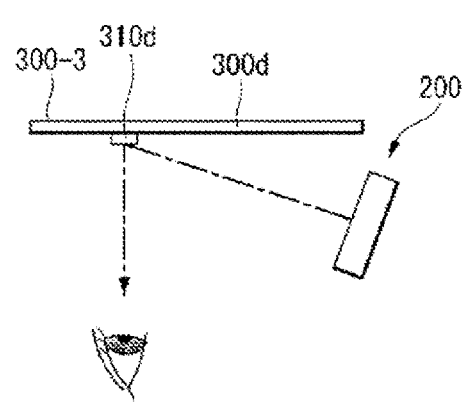
Figure 10:
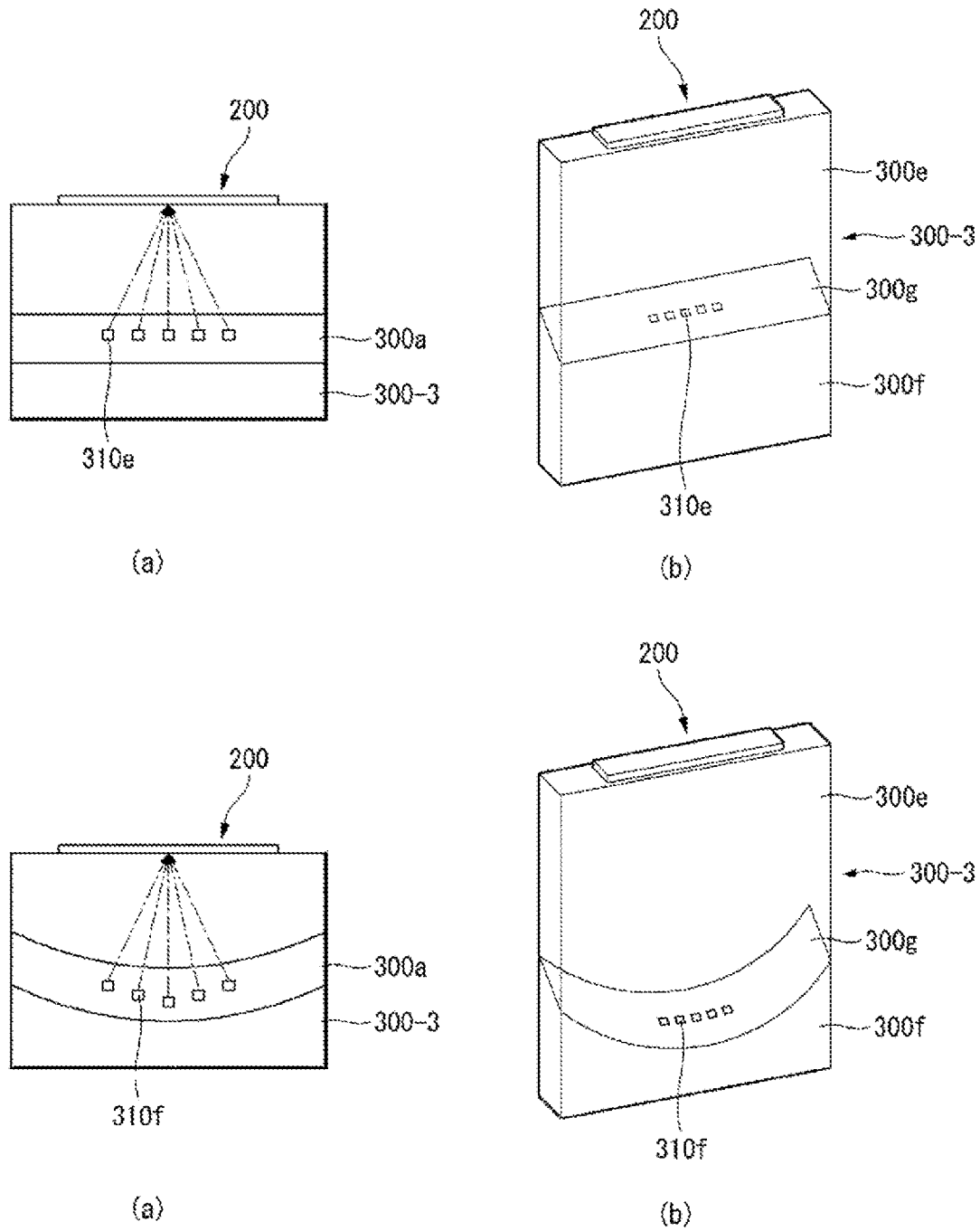
Figure 11:
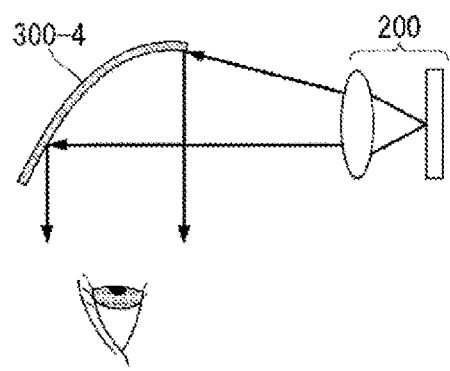
Figure 11:
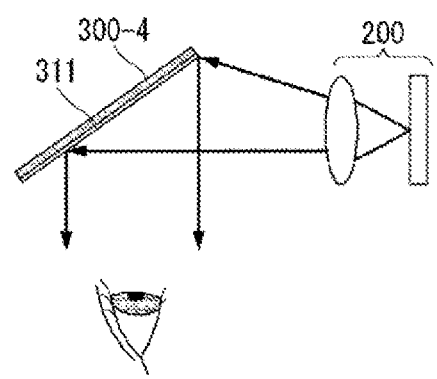
Figure 11:
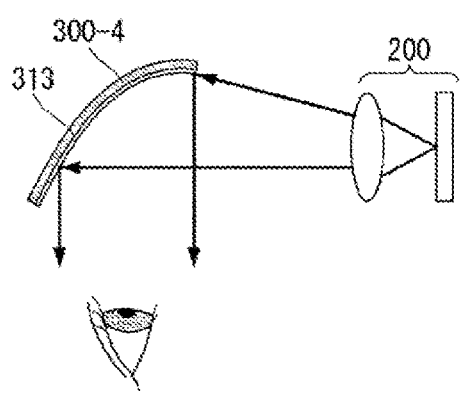
Figure 12:
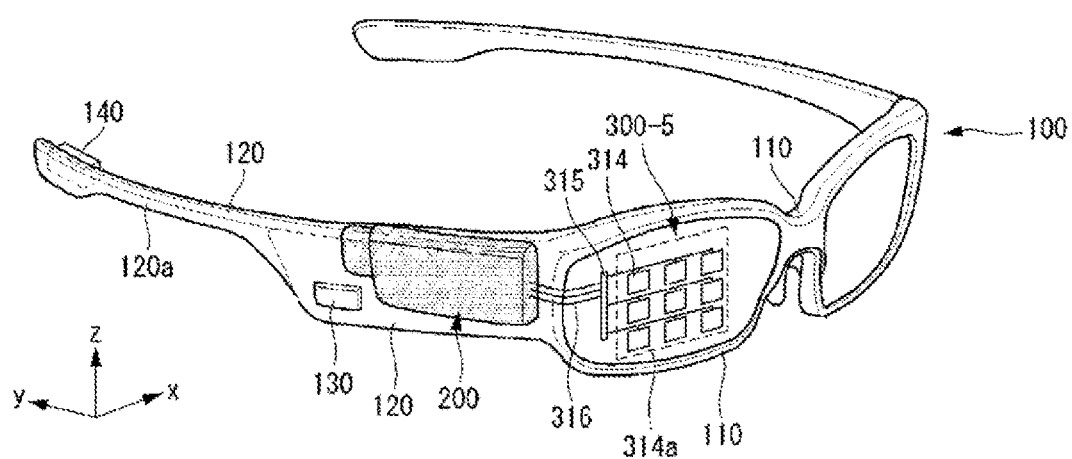
Figure 13:
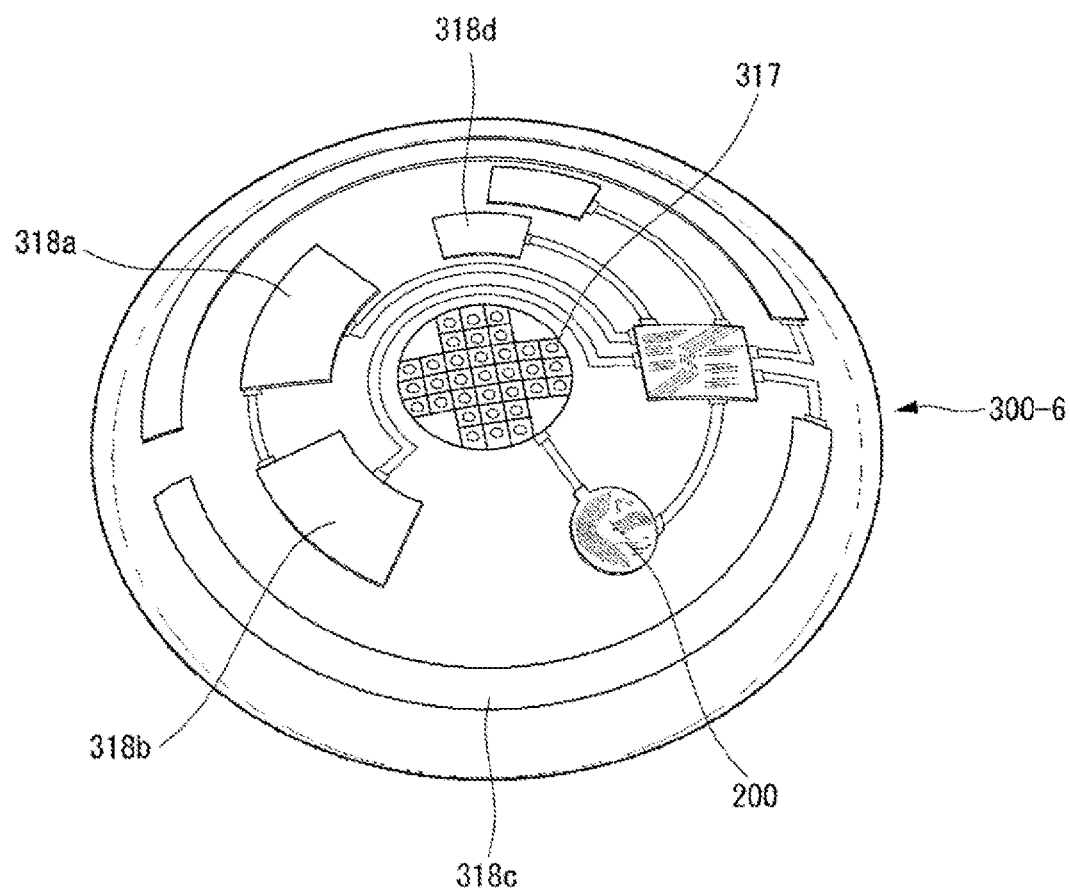

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. In addition, FIG. 12 illustrates one embodiment of a micro-LED type optical element, and FIG. 13 illustrates one embodiment of a display used for contact lenses.

As shown in FIG. 7, the display 300-1 according to one embodiment of the present disclosure may use a prism-type optical element.

In one embodiment, as shown in FIG. 7A, a prism-type optical element may use a flat-type glass optical element where the surface 300a on which image light rays are incident and from which the image light rays are emitted is planar or as shown in FIG. 7B, may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8A, saw tooth prism-type glass optical element as shown in FIG. 8B, glass optical element having a diffractive optical element (DOE) as shown in FIG. 8C, glass optical element having a hologram optical element (HOE) as shown in FIG. 8D, glass optical element having a passive grating as shown in FIG. 8E, and glass optical element having an active grating as shown in FIG. 8F.

As shown in FIG. 8A, the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8B, the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8C may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8D may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8E may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8F may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display 300-3 according to another embodiment of the present disclosure may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9A, the pinhole mirror 310a may be provided on the path of incident light within the display 300-3 and reflect the incident light toward the user's eye. More specifically, the pinhole mirror 310a may be disposed between the front surface (outer surface) and the rear surface (inner surface) of the display 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display 300-3 is changed, the user may still clearly see the real world by overlapping an augmented reality image provided by the controller 200 with the image of the real world.

And the display 300-3 may provide a path which guides the incident light to the pinhole mirror 310a through internal total reflection.

Referring to FIG. 9B, the pinhole mirror 310b may be provided on the surface 300c through which light is totally reflected in the display 300-3. Here, the pinhole mirror 310b may have the characteristic of a prism that changes the path of external light according to the user's eyes. For example, the pinhole mirror 310b may be fabricated as film-type and attached to the display 300-3, in which case the process for manufacturing the pinhole mirror is made easy.

The display 300-3 may guide the incident light incoming from the controller 200 through internal total reflection, the light incident by total reflection may be reflected by the pinhole mirror 310b installed on the surface 300c on which external light is incident, and the reflected light may pass through the display 300-3 to reach the user's eyes.

Referring to FIG. 9C, the incident light illuminated by the controller 200 may be reflected by the pinhole mirror 310c directly without internal total reflection within the display 300-3 and reach the user's eyes. This structure is convenient for the manufacturing process in that augmented reality may be provided irrespective of the shape of the surface through which external light passes within the display 300-3.

Referring to FIG. 9D, the light illuminated by the controller 200 may reach the user's eyes by being reflected within the display 300-3 by the pinhole mirror 310*d* installed on the surface 300*d* from which external light is emitted. The controller 200 is configured to illuminate light at the position separated from the surface of the display 300-3 in the direction of the rear surface and illuminate light toward the surface 300*d* from which external light is emitted within the display 300-3. The present embodiment may be applied easily when thickness of the display 300-3 is not sufficient to accommodate the light illuminated by the controller 200. Also, the present embodiment may be advantageous for manufacturing in that it may be applied irrespective of the surface shape of the display 300-3, and the pinhole mirror 310*d* may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display 300-3.

A plurality of pinhole mirrors 310 are disposed in parallel, being separated from each other, to form an array pattern. The array pattern may form a line pattern or lattice pattern.

FIGS. 10A and B illustrate the Flat Pin Mirror scheme, and FIGS. 10C and D illustrate the freeform Pin Mirror scheme.

When the pinhole mirror 310 is installed inside the display 300-3, the first glass 300*e* and the second glass 300*f* are combined by an inclined surface 300*g* disposed being inclined toward the pupil of the eye, and a plurality of pinhole mirrors 310*e* are disposed on the inclined surface 300*g* by forming an array pattern.

Referring to FIGS. 10A and B, a plurality of pinhole mirrors 310*e* may be disposed side by side along one direction on the inclined surface 300*g* and continuously display the augmented reality provided by the controller 200 on the image of a real world seen through the display 300-3 even if the user moves the pupil of the eye.

And referring to FIGS. 10C and D, the plurality of pinhole mirrors 310*f* may form a radial array on the inclined surface 300*g* provided as a curved surface.

Since the plurality of pinhole mirrors 300*f* are disposed along the radial array, the pinhole mirror 310*f* at the edge in the figure is disposed at the highest position of the inclined surface 300*g*, and the pinhole mirror 310*f* in the middle thereof is disposed at the lowest position, the path of a beam emitted by the controller 200 may be matched to each pinhole mirror.

As described above, by disposing a plurality of pinhole arrays 310*f* along the radial array, the double image problem of augmented reality provided by the controller 200 due to the path difference of light may be resolved.

Similarly, lenses may be attached on the rear surface of the display 300-3 to compensate for the path difference of the light reflected from the plurality of pinhole mirrors 310*e* disposed side by side in a row.

The surface reflection-type optical element that may be applied to the display 300-4 according to another embodiment of the present disclosure may employ the freeform combiner method as shown in FIG. 11A, Flat HOE method as shown in FIG. 11B, and freeform HOE method as shown in FIG. 11C.

The surface reflection-type optical element based on the freeform combiner method as shown in FIG. 11A may use freeform combiner glass 300, for which a plurality of flat surfaces having different incidence angles for an optical image are combined to form one glass 300 with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11B may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11C may have a HOE 313 coated or patterned on the surface of freeform glass, where the operating principles may be the same as described with reference to FIG. 11B.

In addition, a display 300-5 employing micro LED as shown in FIG. 12 and a display 300-6 employing a contact lens as shown in FIG. 13 may also be used.

Referring to FIG. 12, the optical element of the display 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display 300-5 along a conductive input line 316, and the display 300-5 may convert the image signal to light through a plurality of optical elements 314 (for example, microLED) and emits the converted light to the user's eye.

The plurality of optical elements 314 are disposed in a lattice structure (for example, 100×100) to form a display area 314*a*. The user may see the augmented reality through the display area 314*a* within the display 300-5. And the plurality of optical elements 314 may be disposed on a transparent substrate.

The image signal generated by the controller 200 is sent to an image split circuit 315 provided at one side of the display 300-5 through a conductive input line 316; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display 300-5 may include a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318*a*, battery 318*b*, controller 200, antenna 318*c*, and sensor 318*d* in addition to the optical element 317. For example, the sensor 318*d* may check the blood sugar level in the tear, and the controller 200 may process the signal of the sensor 318*d* and display the blood sugar level in the form of augmented reality through the optical element 317 so that the user may check the blood sugar level in real-time.

As described above, the display 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display 300 according to one embodiment of the present disclosure may include a retina scan method.

Figure 14:
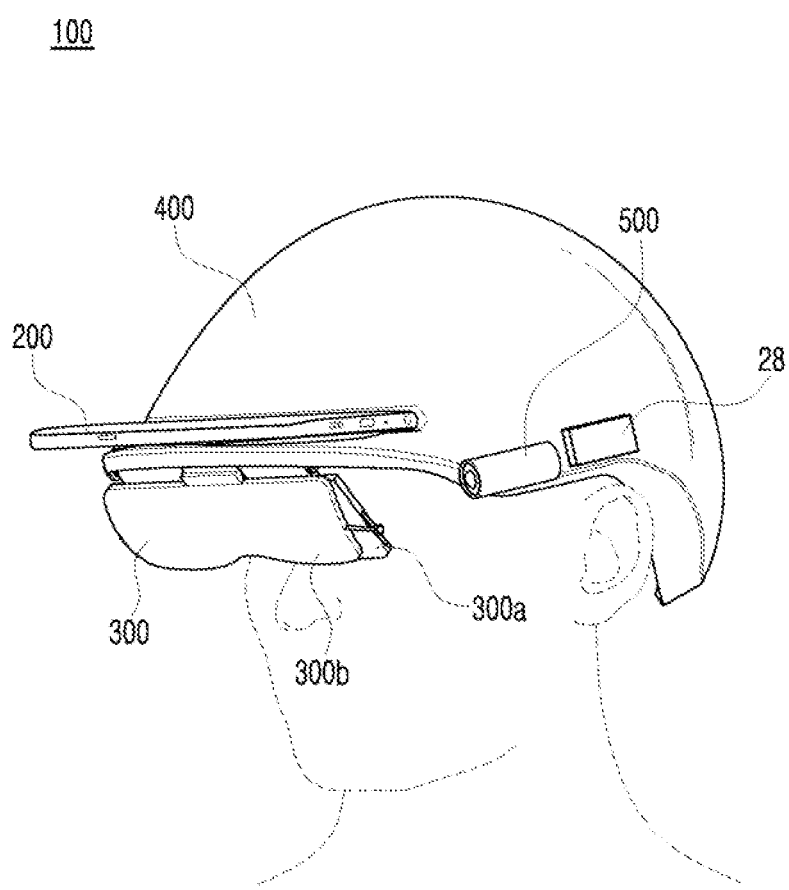
FIG. 14 is a diagram exemplarily illustrating a state of using an electronic device according to an embodiment of the present disclosure.
Figure 15:
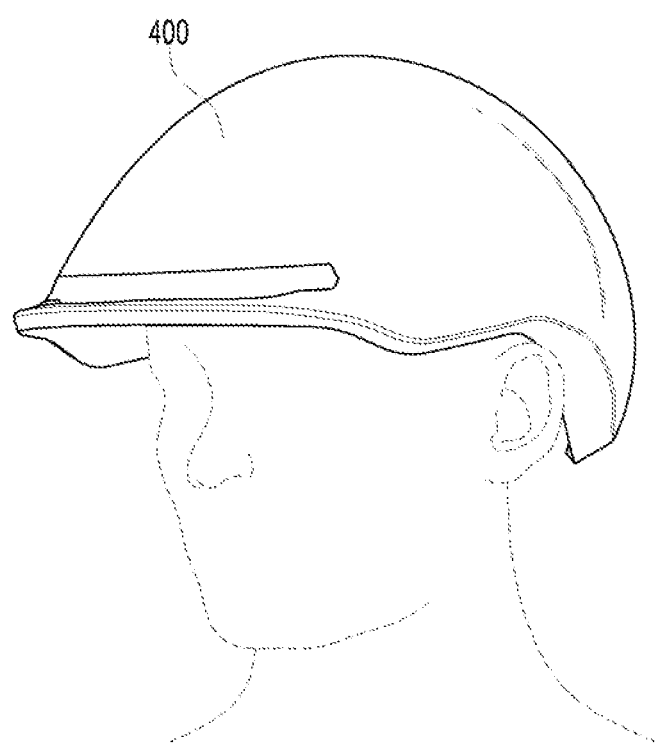
FIG. 15 is a diagram illustrating a state in which a display and a controller are removed from the electronic device of FIG. 14.

FIG. 14 is a diagram exemplarily illustrating a state of using an electronic device according to an embodiment of the present disclosure. FIG. 15 is a diagram illustrating a state in which a display and a controller are removed from the electronic device of FIG. 14.

As shown in FIGS. 14 and 15, an electronic device 100 according to an embodiment of the present disclosure includes a main body 400, a display 300, and a controller 200.

The main body 400 is a part which is wearable on the head of the user and is connected to the display 300 and the controller 200 to be described later to support the display 300 and the controller 200 to perform their functions when the user uses the electronic device 100.

In this case, the main body 400 is constituted by not only a helmet-shaped configuration illustrated in FIGS. 14 and 15, but also a band shape or a predetermined structure to be configured in various configurations worn on the head of the user.

However, for convenience of description, hereinafter, the main body 400 will be described based on the helmet-shaped configuration.

The display 300 is a part coupled to the main body 400 to be detachably attached to the main body 400. The user visually recognizes an external environment through the display 300 and simultaneously, views an image generated by the controller 200 on the display 300.

The display 300 is not fixedly coupled to the main body 400 as shown in FIG. 15 but is detachably coupled to the main body 400 as necessary, so that the user may replace the display 300 with displays 300 formed in different sizes and shapes according to a usage of the electronic device 100.

For example, any one display 300 may be manufactured in a light and compact sunglasses shape to be used for leisure, and the other display 300 may be manufactured to have a larger area and visually implement a lot of information to be used for industry.

Accordingly, when the use of the electronic device 100 is changed, the user may use the main body 400 as it is and replace only the display 300 according to the usage.

The controller 200 is a part installed in the main body 400 to generate an image and implement the image on the display 300 while the display 300 is mounted on the main body 400 and may include various configurations which generate images and transfer the images to the display 300.

For example, as described above, the controller 200 may include a driver 201, an image source panel 203, a Polarization Beam Splitter Filter (PB SF) 211, a mirror 209, a plurality of lenses 213, 215, 217, and 221, a fly eye lens (FEL) 219, a dichroic filter 227, and a Freeform prism Projection Lens (FPL) 223, etc.

As such, since the display 300 is detachably coupled to the main body 400 worn on the head of the user, the electronic device 100 according to the present embodiment may variously replace and use the display 300 according to a usage.

In the electronic device 100 according to the present embodiment, the display 300 may include a plurality of display panels 300a and 300b disposed on different distances from the eyes of the user.

That is, as shown in FIG. 14, when the user uses the electronic device 100, the plurality of display panels 300a and 300b may be disposed on the eyes of the user. In this state, an image from the controller 200 may be implemented to each of the display panels 300a and 300b.

Accordingly, the user may visually recognize the images implemented on different distances from the eyes with the sense of distance. Therefore, a 3D image may be more clearly implemented in the display 300.

In this case, each of the display panels 300a and 300b may be variously configured as necessary: including forming to have different curvatures and placing the display panels with different angles to the eyes of the user from each other.

As such, since the display 300 has a structure of a plurality of layers, the electronic device 100 according to the present embodiment may provide a more 3D visual image to the user.

As shown in FIG. 14, the electronic device 100 according to the present embodiment may further include an image capture means 500 and a power supplier 28.

The image capture means 500 is a part of photographing a user's view field to acquire an image and may include a camera and the like to acquire a scene viewed by the user as an image. The image capture means 500 may be installed in plural to acquire a 3D image.

The power supplier 28 is a part for supplying power to the controller 200 and the image capture means 500 and may receive external power or internal power to supply power to respective components included in the electronic device 100.

In this case, the power supplier 28 includes a battery, and the battery may be provided in a built-in or replaceable form.

In the electronic device 100 further including the above configuration, the image capture means 500 and the power supplier 28 may be installed on the main body 400. That is, the power supplier 28 is not separately installed for each of the controller 200 and the image capture means 500 and may supply power to each configuration from the power supplier 28 installed in the main body 400.

Through this, structures of remaining components other than the main body 400 may be simplified, and the configuration of the main body 400 may also perform a minimum function intended by the user, such as photographing.

As such, the electronic device 100 according to the present embodiment may further include the image capture means 500 and the power supplier 28, and the image capture means 500 and the power supplier 28 may be installed on the main body 400 to more simplify the structures for the configurations other than the main body 400.

Figure 16:
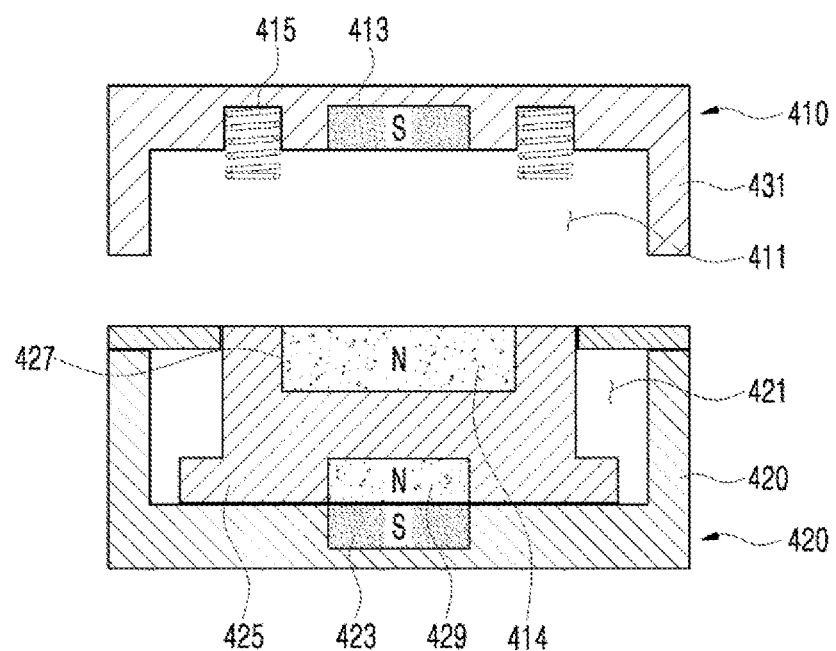
FIGS. 16 and 17 are diagrams illustrating a first coupler and a second coupler in the electronic device of FIG. 14 in more detail.
Figure 17:
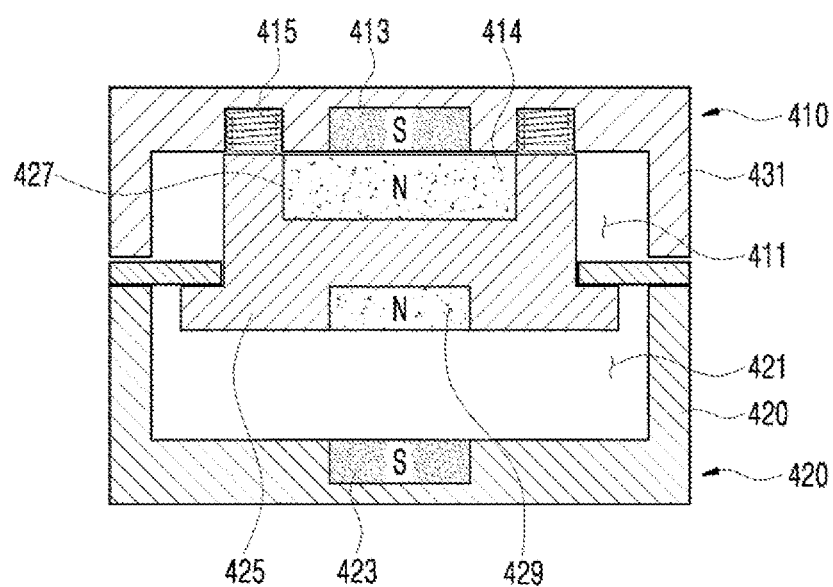

FIGS. 16 and 17 are diagrams illustrating a first coupler and a second coupler in the electronic device of FIG. 14 in more detail.

In the electronic device 100 according to the present embodiment, the main body 400 includes a first coupler 410 formed on a position on which the display 300 is mounted, and the display 300 includes a second coupler 420 which is formed on a position facing the first coupler 410 to be attachable to the first coupler 410. The first coupler 410 and the second coupler 420 may be attached to each other by a magnetic force.

That is, as the first coupler 410 and the second coupler 420 are coupled to each other, the display 300 may be mounted on the main body 400, and the first coupler 410 and the second coupler 420 may be separated from each other so that the display 300 may be removed from the main body 400.

In this case, the first coupler 410 and the second coupler 420 may be attached to each other by a magnetic force through a magnetic body, respectively. In addition, when an external force stronger than the magnetic force by which the first coupler 410 and the second coupler 420 are attached to each other is applied, the first coupler 410 and the second coupler 420 may be separated from each other.

As such, in the electronic device 100 according to the present embodiment, since the first coupler 410 formed on the main body 400 and the second coupler 420 formed on the display 300 may be attached to each other by a magnetic force, the replacement of the display 300 may be more easily performed.

Here, the first coupler 410 is formed with a first groove 411 and a first magnetic body 413 is installed in the first groove 411. The second coupler 420 is formed with a second groove 421, a second magnetic body 423 having the same magnetic pole as the first magnetic body 413 is installed in the second groove 421. A bracket 425 protruding from the second groove 421 is installed in the second groove 421, a third magnetic body 427 having a different magnetic pole from the first magnetic body 413 is disposed on a surface facing the first magnetic body 413, and a fourth magnetic body 429 having the same magnetic pole as the third magnetic body 427 and a smaller magnetic force than the third magnetic body 427 may be installed on a surface facing the second magnetic body 423.

For example, as shown in FIG. 16, the first magnetic body 413 and the second magnetic body 423 of S poles may be installed in the first groove 411 of the first coupler 410 and the second groove 421 of the second coupler 420, respectively.

In addition, the bracket 425 of which the third magnetic body 427 and the fourth magnetic body 429 of N poles are installed on both surfaces may be disposed in the second groove 421. In this case, the third magnetic body 427 may be configured to have a larger magnetic force, for example, a larger area than the fourth magnetic body 429.

In this case, if the first coupler 410 and the second coupler 420 are not close to each other, as shown in FIG. 16, the bracket 425 may be positioned in the second groove 421 as it is by applying attraction between the second magnetic body 423 and the fourth magnetic body 429.

On the other hand, if the first coupler 410 and the second coupler 420 are close to each other, as shown in FIG. 17, the attraction may be applied even between the first magnetic body 413 and the third magnetic body 427. In this case, as described above, since the magnetic force of the third magnetic body 427 is larger than that of the fourth magnetic body 429, the bracket 425 receives greater attraction toward the first magnetic body 413.

Accordingly, the bracket 425 moves toward first groove 411, and as a result, the bracket 425 may protrude from the second groove 421 so that a portion of the bracket 425 may be inserted into the first groove 411.

As such, in the electronic device 100 according to the present embodiment, the bracket 425 to which different magnetic forces are applied from the first coupler 410 and the second coupler 420 is disposed, and the bracket 425 is moved by a magnetic force difference when the first coupler 410 and the second coupler 420 are coupled to each other, and thus, the coupling of the first coupler 410 and the second coupler 420 may be more stably performed.

In the electronic device 100 according to the present embodiment, the first to fourth magnetic bodies 413, 423, 427, and 429 are made of an electromagnet 414 capable of adjusting a magnetic force by a current supplied thereto, and the first coupler 410 may be provided with a first elastic body 415 capable of pressing the bracket 425 by a restoring force at a portion coming into contact with the bracket 425.

That is, the first to fourth magnetic bodies 413, 423, 427, and 429 may be configured by the electromagnet 414 to adjust the magnitude or polarity of the magnetic force according to a current. In this case, if the current supplied to the electromagnet 414 is cut off, the first to fourth magnetic bodies 413, 423, 427, and 429 may lose the magnetic force so that no more attraction between the magnetic bodies may be applied.

In this state, if the first elastic body 415 presses the bracket 425 in a pushing direction, the first coupler 410 and the second coupler 420 may naturally be separated from each other.

As such, in the electronic device 100 according to the present embodiment, since the coupling between the first coupler 410 and the second coupler 420 is controlled by an electromagnetic force, even if an external force for replacing the display 300 is not directly applied by the user, the replacement may be performed.

Figure 18:
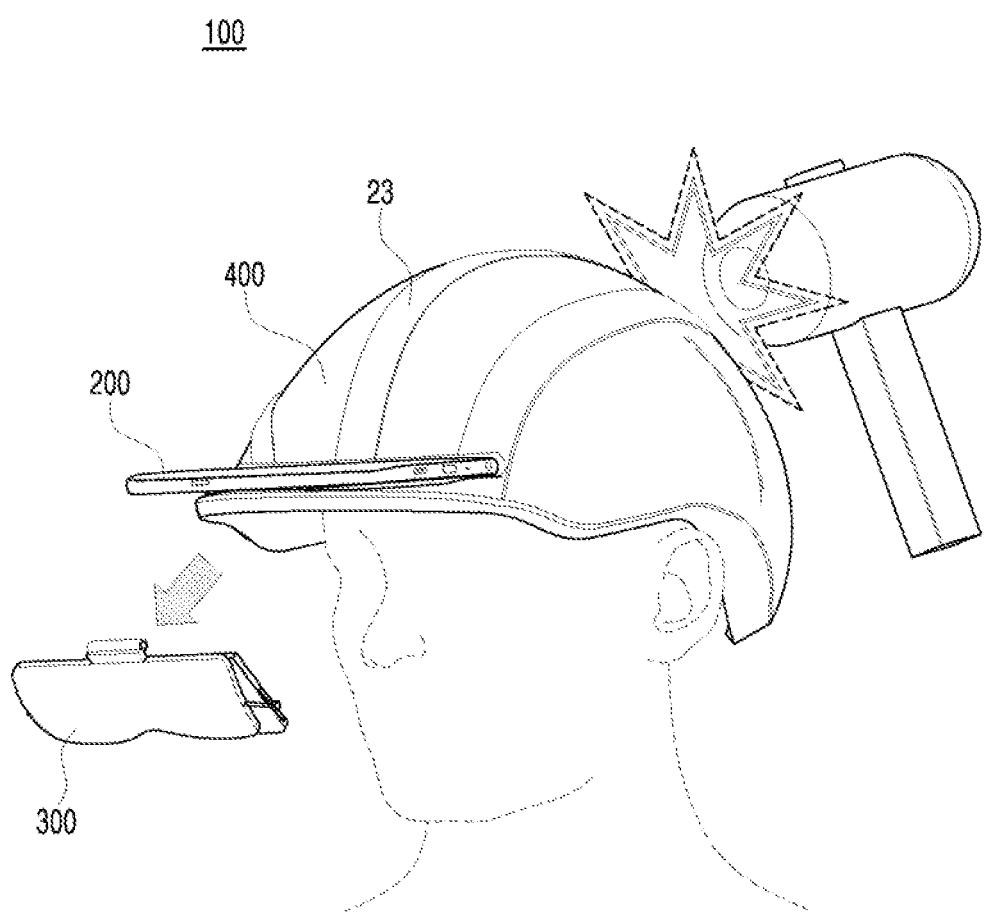
FIG. 18 is a diagram illustrating a process of separating a display from the electronic device of FIG. 14.

FIG. 18 is a diagram illustrating a process of separating the display from the electronic device of FIG. 14.

The electronic device 100 according to the present embodiment further includes a sensor 23 installed in the main body 400 to detect a state of the main body 400, and a current supplied to the electromagnet 414 may be controlled according to the state of the main body 400 detected by the sensor 23.

Specifically, if the display 300 is detachably coupled to the main body 400, it is preferable to separate the display 300 from the main body 400 in a state where the user does not use the electronic device 100.

In this case, since the user may use the main body 400 only for the purpose of a helmet or the like after separating the display 300, the display 300 is rather disturbed to the user or damage to the display 300 may occur.

Therefore, by detecting the state of the main body 400 by the sensor 23, it is possible to empirically estimate what the user wants to use the electronic device 100 for. In addition, if the detachment of the display 300 is automatically adjusted according to the estimated result, convenience may be provided to the user.

As such, since the electronic device 100 according to the present embodiment detects the state of the main body 400 to control the electromagnetic force, the electronic device 100 may properly adjust the detachment of the display 300 according to the state of the main body 400.

Here, the current supplied to the electromagnet 414 may be controlled such that the first magnetic body 413 and the third magnetic body 427 are the same magnetic pole as each other. That is, the electromagnet 414 may be controlled such that the repulsion is applied between the first magnetic body 413 and the third magnetic body 427.

As described above, in order to separate the first coupler 410 and the second coupler 420 from each other, the first coupler 410 and the second coupler 420 may be detached from each other by the first elastic body 415 after the magnetic force is removed by cutting off the current.

However, if the current is controlled so that the repulsion is applied between the first magnetic body 413 and the third magnetic body 427 in addition to cutting off the current, the first coupler 410 and the second coupler 420 may be detached from each other even without a restoring force such as the first elastic body 415.

As such, since the electronic device 100 according to the present embodiment is controlled such that an electromagnetic force is applied to push the first coupler 410 and the second coupler 420 to each other, when it is necessary to remove the display 300, the display 300 may be separated only by the electromagnetic force.

In the electronic device 100 according to the present embodiment, the sensor 23 may include an acceleration sensor that detects a movement state of the main body 400. In this case, the acceleration sensor is a sensor that measures the acceleration of a moving object and may measure the acceleration momentarily applied to the main body 400 to detect the movement state thereof.

For example, in a situation in which the user falls down momentarily while wearing the electronic device 100, the display 300 which partially covers the eyes of the user may rather threaten safety.

Therefore, if the main body 400 is abnormally moved as a result of the measurement through the acceleration sensor, it is preferable to control the display 300 to be automatically removed.

As such, since the electronic device 100 according to the present embodiment detects the movement state of the main body 400 to control the electromagnetic force, when the movement state of the main body 400 is not appropriate, the display 300 may be automatically removed.

In the electronic device 100 according to the present embodiment, the sensor 23 may include a strain gauge that detects a deformation state of the main body 400. In this case, the strain gauge is a gauge attached to an object in order to measure the deformation state and the deformed amount of the object and may detect the deformation state generated in the main body 400.

For example, if a very strong shock is applied while the user wears the electronic device 100, it may be assumed that the user is in danger, so that it is preferable to control the display 300 to be automatically removed.

In addition, in such a case, it is necessary to separate the display 300 far away from the impact applied in that there is a risk of damage to the electronic device 100 itself.

On the other hand, the display 300 can be controlled not to be removed by a minute shock or a general shock of a predetermined amount or less according to a result of measuring the strain gauge, so that inconvenience may not occur when the user uses the electronic device 100.

As such, since the electronic device 100 according to the present embodiment detects the deformation state of the main body 400 to control the electromagnetic force accordingly, when the deformation state of the main body 400 is not appropriate, the display 300 may be automatically removed.

Figure 19:
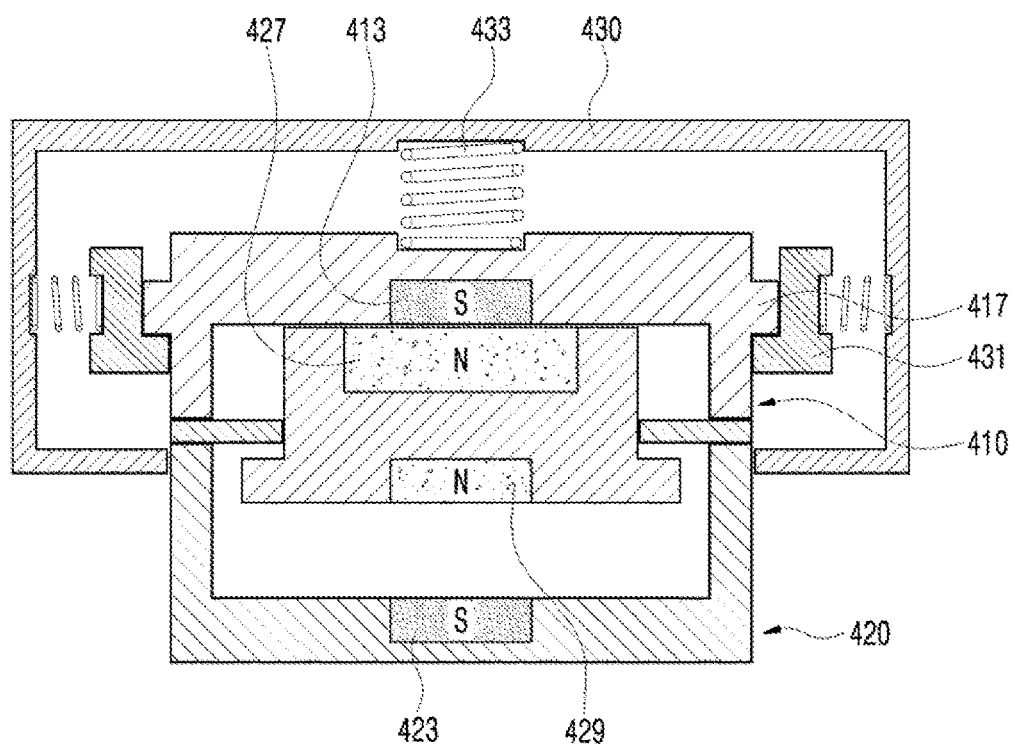
FIGS. 19 and 20 are diagrams illustrating a frame and a first coupler in the electronic device of FIG. 14 in more detail.
Figure 20:
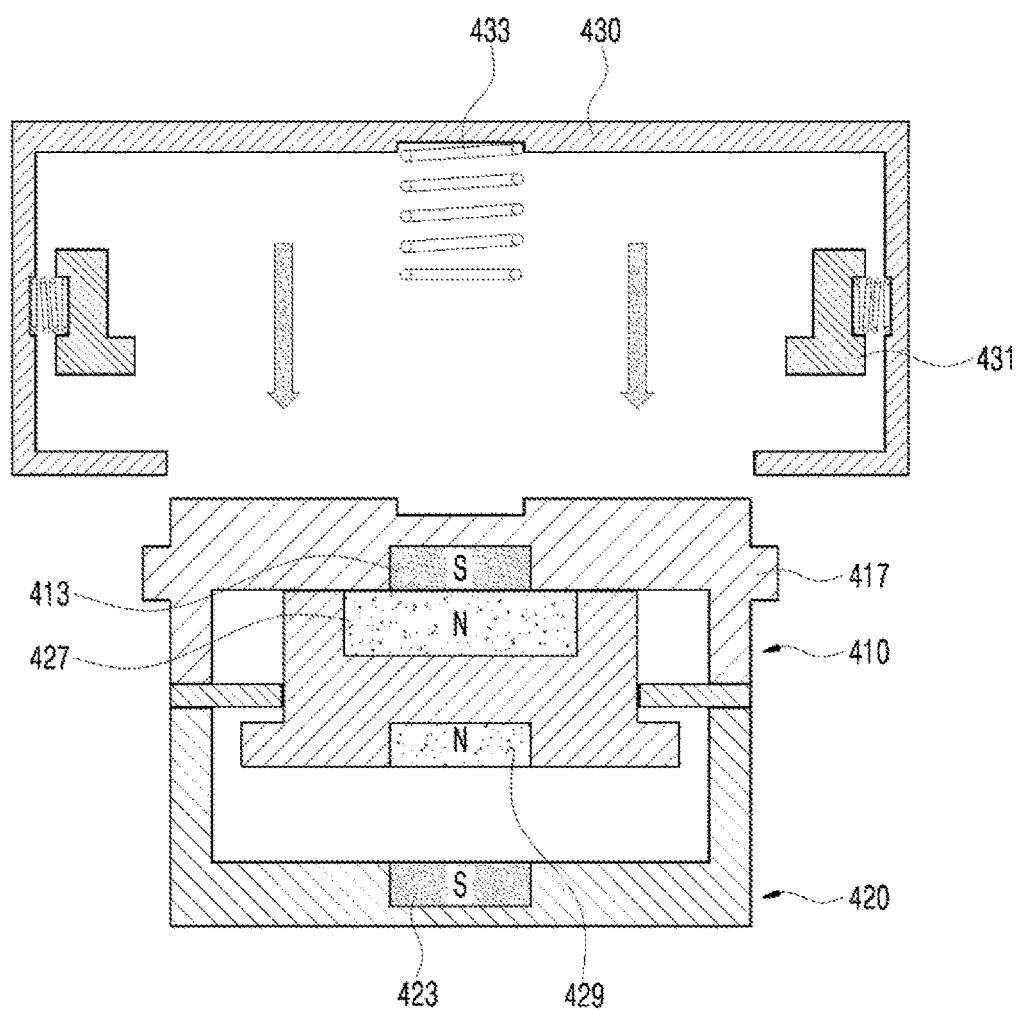

FIGS. 19 and 20 are diagrams illustrating a frame and a first coupler in the electronic device of FIG. 14 in more detail.

In the electronic device 100 according to the present embodiment, the main body 400 further includes a frame 430 covering the first coupler 410 and supporting the first coupler 410 to the main body 400, and the first coupler 410 may be detachably coupled to the frame 430.

That is, as shown in FIG. 19, the first coupler 410 coupled with the second coupler 420 may be supported by the main body 400 while covered by the frame 430. In this case, the frame 430 may be fixedly formed on the main body 400 such as being integrally formed with the main body 400.

As shown in FIG. 20, when a necessary situation occurs, the first coupler 410 is separated from the frame 430, so that the second coupler 420 coupled to the first coupler 410 and the display 300 may also be separated from the main body 400.

As described above, the first coupler 410 is a configuration for detachment of the display 300 from the main body 400, and the first coupler 410 may not be installed in the main body 400 while the user does not use the display 300.

Therefore, in this case, even the first coupler 410 is also separated from the main body 400 so that the user may use only the main body 400 for the minimumuse.

As such, in the electronic device 100 according to the present embodiment, since the main body 400 includes the frame 430 and the first coupler 410 is detachably coupled to the frame 430, it is possible to minimize the configuration of the main body 400 when the display 300 is not used.

Here, the first coupler 410 has protrusions 417 formed on both sides thereof, and the frame 430 may have latches 431 which are engaged with the protrusions 417 and limit the detachment of the first coupler 410 from the frame 430.

That is, as shown in FIG. 19, while the first coupler 410 is coupled to the frame 430, the latch 431 and the protrusion 417 are engaged with each other to prevent the first coupler 410 from being detached from the frame 430. In this case, the latch 431 may be configured to be pressed toward the protrusion 417 by a spring or the like.

On the other hand, as shown in FIG. 20, when the first coupler 410 is to be separated from the frame 430, the pressure applied to the latch 431 is released and the protrusion 417 is detached from the latch 431, so that the first coupler 410 may be separated from the frame 430.

As such, in the electronic device 100 according to the present embodiment, since the first coupler 410 and the frame 430 are limited from being detached from each other through the protrusion 417 and the latch 431, respectively, the coupling of the first coupler 410 and the frame 430 may be more stably performed.

In the electronic device 100 according to the present embodiment, the frame 430 may be provided with a second elastic body 433 capable of pressing the first coupler 410 by a restoring force at a portion coming into contact with the first coupler 410.

That is, as described above, when the pressure applied to the latch 431 is released and the protrusion 417 is detached from the latch 431, the first coupler 410 may be pushed out by the second elastic body 433. Accordingly, the first coupler 410 may be separated from the frame 430 by throwing out.

As such, since the electronic device 100 according to the present embodiment presses the first coupler 410 in the separating direction by the second elastic body 433 installed in the frame 430, when it is necessary to separate the first coupler 410 from the frame 430, the separation may be facilitated using an elastic force.

In the electronic device 100 according to the present embodiment, a plurality of frames 430 are installed on the main body 400, and the first coupler 410 may be selectively fastened to any one of the plurality of frames 430.

Specifically, when the user wears the electronic device 100, the display 300 needs to be disposed at an optimal focal distance in order to visually recognize a clearer image.

However, the focal distance may vary depending on the characteristics of the user and may also vary according to a type of image to be implemented. Therefore, it is necessary to adjust the position where the display 300 is disposed in consideration of such situations.

As such, in the electronic device 100 according to the present embodiment, since a plurality of frames 430 is installed and the first coupler 410 is selectively fastened to any one of the plurality of frames 430, the display 300 may be installed at an optimal focal distance according to a situation.

Figure 21:
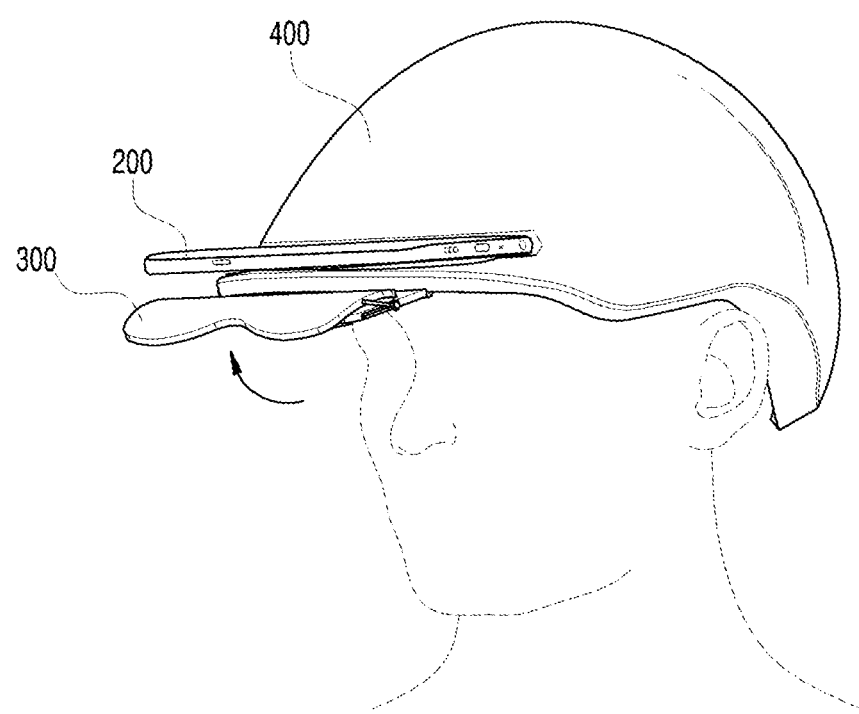
FIG. 21 is a diagram illustrating a process of adjusting an angle of the display in the electronic device of FIG. 14.

FIG. 21 is a diagram illustrating a process of adjusting an angle of the display in the electronic device of FIG. 14.

In the electronic device 100 according to the present embodiment, the display 300 may be hinged to adjust an angle to the eyes of the user.

That is, as shown in FIG. 21, the display 300 may be hinged to the main body 400 to be rotated forward and backward. As a result, the user may adjust the angle between the display 300 and the eyes of the user.

Therefore, the angle between the display 300 and the eyes of the user is adjusted in consideration of the shape and distance of eyes on bodies of the various users, so that the image of the display 300 can be viewed more clearly.

In addition, when the user does not need to use the display 300 for a relatively short time in the process of using the electronic device 100, as described above, it may be very cumbersome to remove the display 300 and mount the display 300 again when reusing.

Therefore, in this case, the user uses the electronic device 100 while the display 300 is rotated to an angle that does not interfere with the viewing range of the user, and then rotate the display 300 in reverse when there is a need to use the display 300 again.

As such, since the electronic device 100 according to the present embodiment may adjust the angle of the display 300 with respect to the eyes of the user, the display 300 may be adjusted to have an optimal viewing angle according to the physical characteristics of the user.

Meanwhile, as shown in FIGS. 14 and 15, the electronic device 100 according to the present embodiment may replace the controller 200. That is, the controller 200 may be coupled to the main body 400 to be detachable from the main body 400.

The controller 200 is not fixedly coupled to the main body 400 as shown in FIG. 15 but is detachably coupled to the main body 400 as necessary, so that the user may replace the controller 200 with controllers 200 implemented in different functions according to a usage of the electronic device 100.

For example, any one controller 200 may be manufactured to implement the RGB full color, and the other controller 200 may be manufactured to more simplify the structure by implementing only a single color.

Accordingly, when the purpose of using the electronic device 100 is changed, the user may use the main body 400 as it is and use only the controller 200 to be replaced according to the usage.

As such, since the controller 200 is detachably coupled to the main body 400 worn on the head of the user, the electronic device 100 according to the present embodiment may variously replace and use the controller 200 according to a usage.

Here, the main body 400 and the controller 200 may be attached to each other by a magnetic force. That is, the main body 400 and the controller 200 may be attached to each other by a magnetic force through each magnetic body. In addition, when an external force stronger than the magnetic force by which the main body 400 and the controller 200 are attached to each other is applied, the main body 400 and the controller 200 may be detached from each other.

As such, in the electronic device 100 according to the present embodiment, since the main body 400 and the controller 200 are attached to each other by a magnetic force, the controller 200 may be replaced more easily.

Particular embodiments or other embodiments of the present disclosure described above are not mutually exclusive to each other or distinguishable from each other. Individual structures or functions of particular embodiments or other embodiments of the present disclosure described above may be used in parallel therewith or in combination thereof.

For example, it means that structure A described with reference to a specific embodiment and/or figure and structure B described with reference to other embodiments and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

What is claimed is:

1. An electronic device comprising:
    a main body wearable on a head of a user;
    a display coupled to the main body to be detachable to the main body; and
    a controller configured to generate images to implement the images on the display while the display is mounted on the main body,
    wherein the main body includes a first coupler formed on a position where the display is mounted,
    the display includes a second coupler which is formed on a position facing the first coupler to be attachable to the first coupler, and
    the first coupler and the second coupler are attachable to each other by a magnetic force,
    wherein the first coupler has a first groove and a first magnetic body is installed in the first groove,
    wherein the second coupler has a second groove, a second magnetic body having the same magnetic pole as the first magnetic body is installed in the second groove, and a bracket protruding from the second groove is installed in the second groove, and
    wherein in the bracket, a third magnetic body having a different magnetic pole from the first magnetic body is installed on a surface facinq the first magnetic body and a fourth magnetic body having the same magnetic pole as, and a smaller magnetic force than, the third magnetic body is installed on a surface facing the second magnetic body.

2. The electronic device of claim 1, wherein the first to fourth magnetic bodies are made of an electromagnet capable of adjusting a magnetic force by a current supplied thereto, and
    the first coupler is provided with a first elastic body capable of pressing the bracket by a restoring force at a portion coming into contact with the bracket.

3. The electronic device of claim 2, further comprising:
    a sensor installed in the main body to detect a state of the main body,
    wherein a current supplied to the electromagnet is controlled according to the state of the main body detected by the sensor.

4. The electronic device of claim 3, wherein the current supplied to the electromagnet is controlled such that the first magnetic body and the third magnetic body have the same magnetic pole as each other.

5. The electronic device of claim 3, wherein the sensor includes an acceleration sensor that detects a movement state of the main body.

6. The electronic device of claim 3, wherein the sensor includes a strain gauge that detects a deformation state of the main body.

7. The electronic device of claim 1, wherein the main body further includes a frame covering the first coupler and supporting the first coupler to the main body, and
the first coupler is detachably coupled to the frame.

8. The electronic device of claim 7, wherein the first coupler has protrusions formed on both sides thereof, and
the frame has latches which are engaged with the protrusions and limit the detachment of the first coupler from the frame.

9. The electronic device of claim 8, wherein the frame is provided with a second elastic body capable of pressing the first coupler by a restoring force at a portion coming into contact with the first coupler.

10. The electronic device of claim 9, wherein the frame includes a plurality of frames installed on the main body, and the first coupler is selectively fastened to any one of the plurality of frames.

11. The electronic device of claim 1, wherein the display includes a plurality of display panels configured to be disposed at different distances from eyes of the user.

12. The electronic device of claim 1, further comprising:
a camera configured to photograph a viewing range of the user to acquire an image; and
a power supplier configured to supply power to the controller and the camera,
wherein the camera and the power supplier are installed on the main body.

13. The electronic device of claim 1, wherein the display is hinged to adjust an angle with respect to eyes of the user.

14. The electronic device of claim 1, wherein the controller is coupled to the main body to be detachable from the main body.

15. The electronic device of claim 14, wherein the main body and the controller are attachable to each other by a magnetic force.

* * * * *